United States Patent [19]
Malik

[11] Patent Number: 5,760,964
[45] Date of Patent: Jun. 2, 1998

[54] OPTICAL ENGINE FOR TRICOLOR PROJECTORS

[75] Inventor: Amjad I. Malik, Vancouver, Wash.

[73] Assignee: Delta America Ltd., Fremont, Calif.

[21] Appl. No.: 705,706

[22] Filed: Aug. 20, 1996

[51] Int. Cl.$^6$ ............................................. G02B 27/14
[52] U.S. Cl. ................................... 359/634; 349/114
[58] Field of Search ............................ 359/634; 349/8, 349/114

[56] References Cited

U.S. PATENT DOCUMENTS

| | | | |
|---|---|---|---|
| 3,704,061 | 11/1972 | Travis | 359/634 |
| 4,516,837 | 5/1985 | Soref et al. | 350/347 |
| 4,850,685 | 7/1989 | Kamakura et al. | 350/397 |
| 4,904,061 | 2/1990 | Aruga | 350/339 |
| 5,067,799 | 11/1991 | Gold et al. | 359/490 |
| 5,096,288 | 3/1992 | Yano et al. | 359/196 |
| 5,097,323 | 3/1992 | Sato et al. | 359/40 |
| 5,105,265 | 4/1992 | Sato et al. | 359/40 |
| 5,115,305 | 5/1992 | Baur et al. | 358/60 |
| 5,153,752 | 10/1992 | Kurematsu et al. | 359/40 |
| 5,157,523 | 10/1992 | Yamagishi et al. | 359/41 |
| 5,170,250 | 12/1992 | Ledebuhr | 358/60 |
| 5,221,998 | 6/1993 | Sugahara | 359/831 |
| 5,241,407 | 8/1993 | Sonehara et al. | 359/40 |
| 5,245,449 | 9/1993 | Ooi et al. | 359/40 |
| 5,270,804 | 12/1993 | Lach | 358/62 |
| 5,276,523 | 1/1994 | Kurematsu et al. | 358/236 |
| 5,283,600 | 2/1994 | Imai | 353/34 |
| 5,298,986 | 3/1994 | Owada et al. | 348/762 |
| 5,404,234 | 4/1995 | Taniguchi et al. | 359/15 |
| 5,418,583 | 5/1995 | Masumoto | 353/38 |
| 5,418,586 | 5/1995 | Fujimori et al. | 353/122 |
| 5,424,868 | 6/1995 | Fielding et al. | 359/634 |
| 5,481,320 | 1/1996 | Konuma et al. | 348/751 |

FOREIGN PATENT DOCUMENTS

| | | |
|---|---|---|
| 2-301739(A) | 12/1990 | Japan . |
| 3-84536(A) | 4/1991 | Japan . |
| 4-223456(A) | 8/1992 | Japan . |

*Primary Examiner*—David C. Nelms
*Assistant Examiner*—Thomas Robbins
*Attorney, Agent, or Firm*—Skjerven, Morrill, MacPherson, Franklin & Friel; David W. Heid

[57] ABSTRACT

Described is an improved optical engine including dichroic mirror elements that have opposing substantially parallel planar surfaces, with the mirror elements positioned and oriented selectively and simultaneously to split a first light beam incident upon one of the opposing surfaces and to recombine modulated second and third beams incident upon the other of the opposing surfaces, wherein a beam of light emerging from the one of the opposing surfaces contains both modulated and unmodulated color components. Preferably, the invented optical engine takes the form of concentric squares, when viewed normal to a plane in which its optical elements lie, wherein the interior square contains plural dichroic elements and the exterior square contains plural turning mirror elements. The optical engine may be used along with conventional other optical elements including, for example, white light sources, turning mirrors, liquid crystal shutters and optical output stacks, to render a pixel-modulated tricolor projector. Preferably, coated plate glass dichroic elements within the invented image provide dual functionality with respect to various of the three colored light beams, i.e. splitting two unmodulated color beams incident upon a first surface thereof and reflecting one of them while simultaneously combining the reflected one of them with a modulated third color beam incident upon an opposite surface thereof to produce a light beam that emerges from the first surface that contains both modulated and unmodulated color components. Pupil and image astigmatism correction are performed by plate assemblies positioned in the input white and output tricolor paths of the engine.

17 Claims, 2 Drawing Sheets

OPTICAL ENGINE FOR TRICOLOR PROJECTORS

BACKGROUND AND SUMMARY OF THE INVENTION

The invention generally relates to tricolor image projection systems. More particularly, it concerns an improved optical engine capable of high-resolution, high-contrast, high-brightness tricolor image projection for small, light-weight and inexpensively and easily manufactured and maintained projectors.

Optical engines are used in tricolor optical projectors to split white light typically into the three primary colors, to modulate the three colored light beams as by use of pixelated light valves and to combine the three modulated color light beams into a tricolor beam for image projection. Typically, such optical engines utilize turning mirrors for folding light beams, multi-layer, thin-film dichroic mirrors for selectively transmitting certain color spectra while reflecting others and liquid crystal shutters for pixelated modulation under the control of a digital or analogue signal processor or controller. These optical elements may be configured on plates, e.g. of glass or high-index plastic, or in some cases may be applied as films or coatings directly to interior or exterior surfaces of solid prisms of glass, plastic or other optically suitable material.

In the invented optical engine, the dichroic mirror elements include opposing substantially parallel planar surfaces, with the elements positioned and oriented so as to selectively and simultaneously split an unmodulated, first light beam incident upon one of the opposing dichroic surfaces and to recombine modulated second and third beams incident upon the other of the opposing surfaces, wherein a beam of light emerging from the one of the opposing surfaces contains both modulated and unmodulated color components. Preferably, the invented optical engine takes the form of concentric squares, when viewed normal to a plane in which its optical elements lie, wherein the interior square contains plural dichroic elements and the exterior square contains plural turning mirror elements. The optical engine may be used along with conventional other optical elements including, for example, white light sources and output optical elements, to render a pixel-modulated tricolor projector.

There are many advantages to the invented optical engine. These include its relative compactness for a given projected image aperture, its geometric symmetry within the plane in which its optical elements lie and its ease of optical calibration and alignment. It is characterized also as providing equal optical path lengths for the three primary colored beams of light, by virtue of their traversing not only equal physical path lengths, but also as traversing the same number and type of optical elements within the engine. The invented engine is also free of astigmatic aberrations.

Preferably, coated plate glass dichroic elements within the invented engine provide dual functionality with respect to various of the three colored light beams, i.e. splitting two unmodulated color beams (traversing what will be referred to herein as the illumination path within the display projector) incident upon a first surface thereof and reflecting one of them while simultaneously combining the reflected one of them with a modulated third color beam (traversing what will be referred to herein as the projection path within the display projector) incident upon an opposite surface thereof to produce a light beam that emerges from the first surface that contains both modulated and unmodulated color components.

This dual functionality in a single dichroic mirror element, and within the same dichroically active region thereof, reduces parts count, inter-optical element alignment, volume, weight and cost. Further, any pupil or astigmatism correction need be performed only once, and in a single location adjacent an entry and/or exit region of the invented optical engine, on the tricolor beams of light. This is a significant advantage over prior art engines where astigmatism correction must be replicated for each separate color beam of light, which replication increases parts count, volume and manufacturing and maintenance costs. The achievement of the invented optical engine is high-quality, high-brightness image production at low volume, weight and cost.

These and other objects and advantages of the invention will be more clearly understood from a consideration of the accompanying drawings and the following description of the preferred embodiment.

DETAILED DESCRIPTION OF THE PREFERRED EMBODIMENTS

The invented optical engine is for use in a projected display device capable, for example, of projecting still or motion pictures and computer data for audience presentations. The optical engine preferably takes the form of a concentric square or cubic configuration shown in FIGS. 1 and 2. The square geometry, or topology, refers to the shape of the cross section of the areas defined between various optical elements that form the optical engine. Square herein may be used interchangeably with cube or cubic.

In the illustrated configuration, the optical elements including the turning mirrors, the dichroic mirrors, the light valves and the correction plates may be mounted in any suitable way thereby to position and orient them as shown, e.g. by use of a cast polymer armature or enclosure. Any such conventional mounting structure renders a mechanically and optically durable and compact optical engine capable of splitting white light into three colors, e.g. red, green and blue, pixel-modulating the individual colors by a video signal produced by a suitable signal processor and combining the modulated colors into a tricolor rendition for projected display on a wall or screen.

Figure 1:
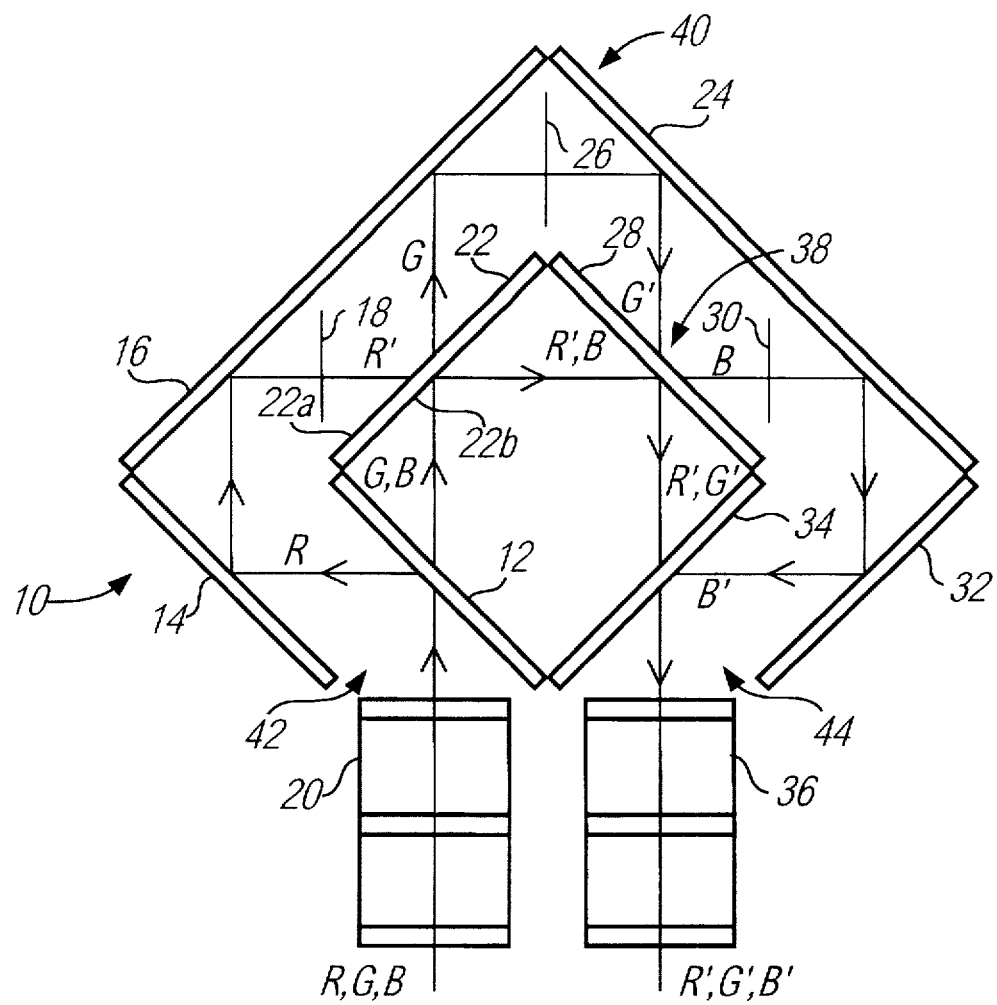
FIG. 1 is a schematic block diagram of an optical engine made in accordance with a preferred embodiment of the invention.
Figure 2:
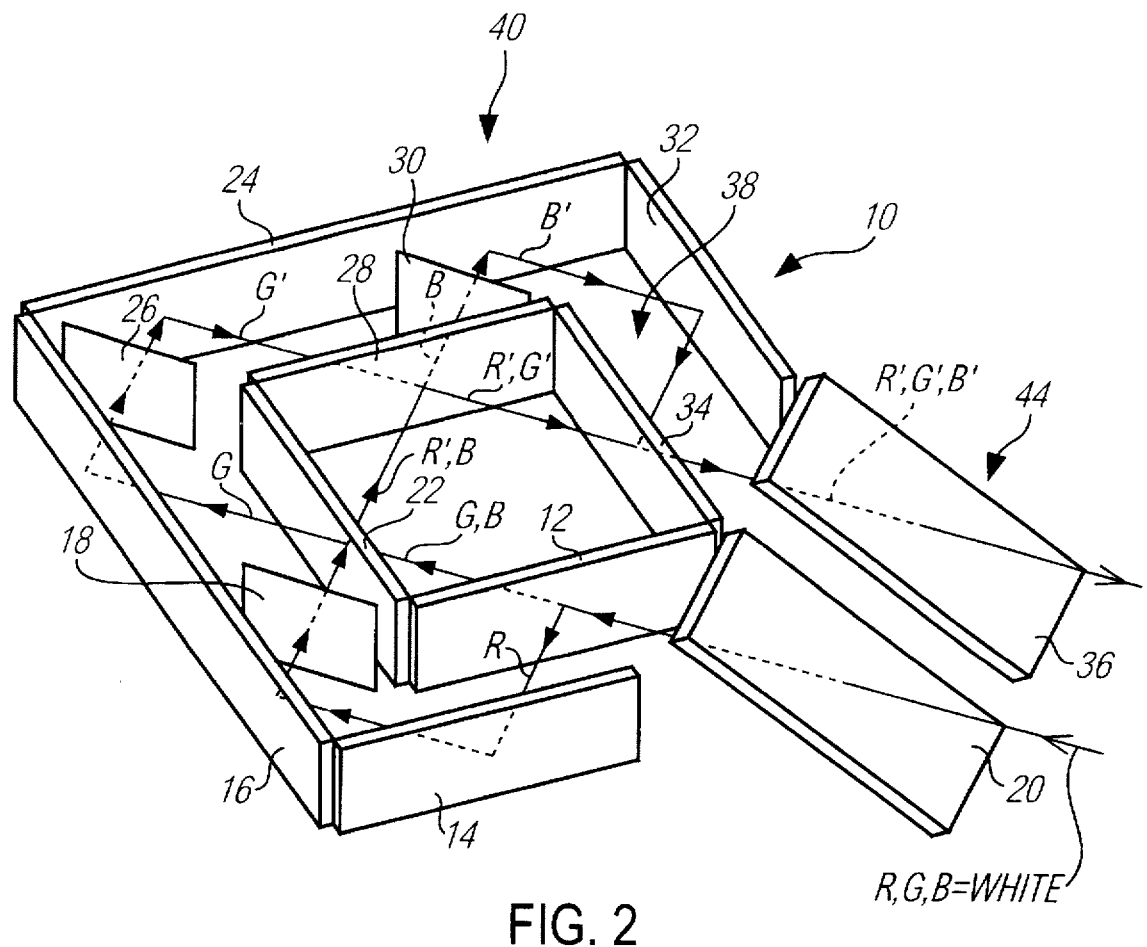
FIG. 2 is an isometric view of the optical engine of FIG. 1.

FIGS. 1 and 2 show a square or cubic optical engine 10 useful for color separation and combination. White light enters the lower face of the cube and is dichroically split at the interior, dichroically prepared surface of a first dichroic mirror 12 to produce a red R beam and a green/blue (GB) beam. It may be seen that the red beam is reflected toward a pair of cooperative turning mirrors 14, 16 and through a first transmissive light valve 18, which modulates red beam R under the control of a conventional signal processor or controller, not shown, and transmits the modulated red beam R' therethrough. It will be understood that the dichroic and turning mirrors preferably are parallel planar glass plates each coated on its interior surface (by which is meant the geometrically interior surface, or that nearer the geometric center of the concentric squares) with dichroic, i.e. color spectrally selectively transmissive/reflective, or with totally reflective, material.

It will be understood that turning dichroic and turning mirrored surfaces need be prepared for selective transmission/reflection or total reflection, respectively, only in a region thereof corresponding with a desired two-dimensional image aperture, and that co-planar, adjacent turning mirrors (such as those represented in FIGS. 1 and 2 as mirror 16) may share a glass substrate as shown or may be separate glass plate structures suitably mounted for co-planar alignment. The dichroic and turning mirrors are configured within the plane of the engine into a pair of concentric squares (when viewed normal to such plane), in accordance with a preferred embodiment of the invention, by any suitable mounting structure. Those of skill in the art will appreciate that preferably the so-called white light entering optical engine 10 may be corrected at the input region by passing it as shown through a pupil astigmatism corrector plate assembly 20.

The green/blue beam GB is transmitted through first dichroic mirror 12 and is incident upon a second dichroic mirror 22, which splits the green and blue beams by reflecting the blue beam and by transmitting the green beam toward a pair of turning mirrors 16, 24 and through a second transmissive light valve 26. It may be seen that the modulated red beam is transmitted through second dichroic mirror 22 and is combined with the reflected blue beam at the interior surface thereof. The modulated red beam and the unmodulated blue beam are incident upon an interior dichroically prepared surface of a third dichroic mirror 28. At that surface, the modulated green beam from mirror 24 and the unmodulated blue beam are transmitted through third dichroic mirror 28, at substantially right angles to one another, while the modulated red beam is reflected. As may be seen, then, the red and green beams effectively are combined with one another to produce a modulated red, green (R'G') beam that is incident upon a fourth dichroic mirror 34.

Referring still collectively to FIGS. 1 and 2, it may be seen that the blue beam passes through a third transmissive light valve 30 toward a pair of turning mirrors 24 (which it may be seen provides two distinct turning regions used to turn the green and blue beams, and which it will be understood instead may be two separate, co-planar mirrors), 32, as shown. Finally, at the interior surface of fourth dichroic mirror 34, the red and green modulated beams are transmitted through dichroic mirror 34 while the modulated blue beam from mirror 32 is reflected, thereby combining the three modulated beams in a substantially collimated tricolor beam of light that exits an exit region of optical engine 10, as indicated at 44. It will be understood that, within the spirit and scope of the invention, the red, green and blue beams of light may be split and directed through optical engine 10 in any desired manner, i.e. the colors may be interchanged with one another by simply changing the pass-band characteristics of the dichroic elements.

Figure 3:
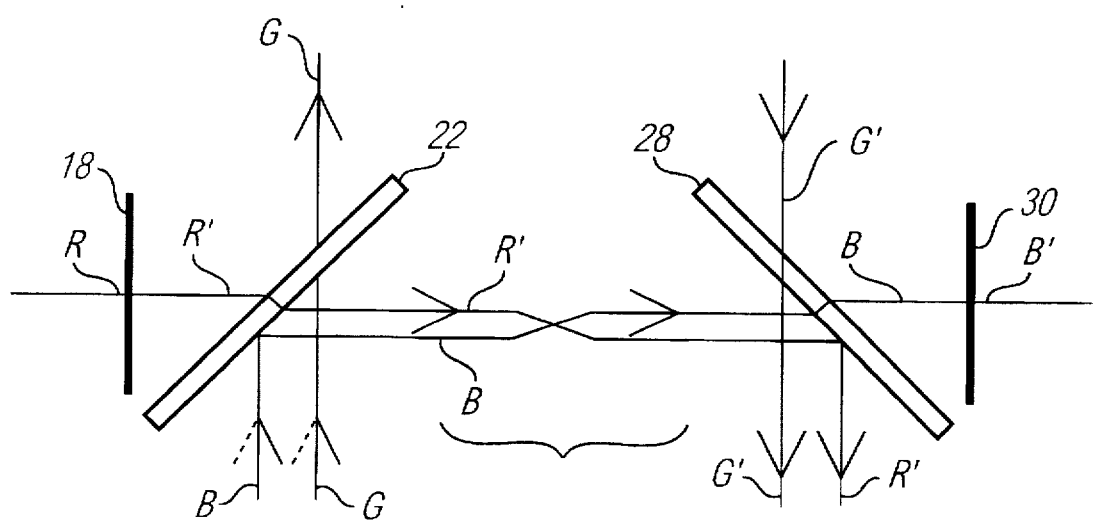
FIG. 3 is an enlarged fragmentary view illustrating the dual functionality performances of two of the dichroic mirrors employed in the engine of FIGS. 1 and 2.

Focusing attention for a moment on some unique interaction which occurs optically in connection with dichroic mirrors 22, 28, and directing attention now to FIG. 3 along with FIGS. 1 and 2, these two mirrors are referred to herein collectively as a pair of optically spaced dichroic mirrors which includes an optical upstream mirror, mirror 22, and an optical downstream mirror, mirror 28. In the specific embodiment of engine 10 which has been described so far, these two planar mirrors lie in planes which are at an angle to one another and which specifically illustrated are orthogonal relative to one another and each normal to a plane which is parallel to the plane of FIG. 1. From the description which has been given herein above, it can be seen that these two mirrors are organized in such a fashion that both function for activities of both splitting and combining of light beams and of components thereof in the engine. One can see, for example, that the combining which is performed by the downstream mirror includes a beam component, R', with respect to which combining has been performed by the upstream mirror which combines the R and B beam components. Another way of viewing the interaction between mirrors 22, 28 is that, with regard to the combining activity which is performed by mirror 28, such combining activity takes place with respect to a beam component G which was split by upstream mirror 22.

Continuing with, and completing a description of FIGS. 1 and 2, it will be appreciated that an image astigmatism corrector plate 36 may be placed near exit region 44 in the path of such modulated tricolor beam of light. This represents another advantage of the invention. Because the three color beams emerge from fourth dichroic mirror 34 in a coaxial tricolor beam of light the three color components of which have traversed identical optical paths, the emergent modulated tricolor beam may be very straightforwardly corrected by a common correction plate assembly. Prior art optical engines have required separate treatment or processing of the three color beams within their individual paths within the engine, thus increasing, e.g. tripling, the number of optical correction elements required to produce high-quality images and increasing the size, the weight and the cost of projectors incorporating such prior art engines.

By equal optical path length is meant both the physical length of the beams' paths through the engine, and, equally importantly, the optical length of the beams' paths. It may be seen best perhaps from FIG. 1 that each of the three primary color beams traverses an identical number of glass plates in its traversal of optical engine 10. The red color beam traverses dichroic mirror 12 twice, dichroic mirror 22 once and dichroic mirror 34 once, for a total of four traversals. The green color beam traverses each of four dichroic mirrors 12, 22, 28, 34 once, for a total of four traversals. The blue color beam traverses dichroic mirrors 12, 28 once each and dichroic mirror 34 twice, for a total of four traversals. In accordance with the preferred embodiment of the invention, dichroic mirrors 12, 22, 28, 34 are made of the same glass type, thickness and surface preparation; multi-layer, thin-film light valves 18, 26, 30 are of the same type and thickness; and each primary color beam traverses an identical physical path length through optical engine 10. Thus, the three color beams 'see' substantially identical optical interference through engine 10, and thus any distortion thereof may be compensated by common input and output correction structure such as pupil astigmatism correction plate 20 and image astigmatism correction plate 36.

Those skilled in the art will appreciate that astigmatism correction plates 20, 36 preferably are twice the thickness of the glass plates mounting dichroic mirrors 12, 22, 28, 34 and are rotated as shown, thereby providing precise compensation for any astigmatism that is introduced into the tricolor beams as they traverse the dichroic mirrors within optical engine 10.

Thus, a modulated tricolor beam of light compactly and simply is produced by optical engine 10, without pupil or image astigmatism. Moreover, it will be appreciated that the red, green and blue beams of light have preferably substantially equal, and most preferably identical, optical path lengths through the optical engine, thereby producing the highest quality tricolor image for projection. It will also be appreciated that typically a baffle structure would be provided between the entry and exit faces to prevent interference between the entering and exiting light. It also will be appreciated that internal baffling typically would be provided to separate the three colored light beam regions and to protect against color cross-contamination.

In summary, the invention may be described as constituting an improved optical engine for use in a polychromatic projector having a white light source and an image processor, by which of course is meant the signal processor that provides control signals to the liquid crystal shutters to modulate individual tricolor pixels in the to-be-projected image. The engine preferably includes plural dichroic mirrors such as mirrored plates 12, 22, 28, 34; plural turning mirrors such as mirrors 14, 16, 24, 32; and plural light valves or liquid crystal shutters 18, 26, 30 each for modulating a monochromic beam of light responsive to such an image processor operatively connected thereto, the turning mirrors and the shutters in a defined configuration splitting white light incident upon one or more optical surfaces such as dichroic mirrors 12, 22 from such a light source into at least three primary color light beams, directs each light beam, e.g. via turning mirrors 14, 16, 24, 32, through at least one of the shutters and combines the light beams into a polychromatic beam of light for projection of an image represented thereby.

In accordance with the preferred embodiment of the invention described and illustrated herein, the optical engine includes mounting structure, not shown for the sake of clarity, for mounting the various optical elements on plate structures and for aligning them with one another into the desired concentric square configuration. Such mounting structure may be conventional, as by the use of a lightweight cast polymer armature or enclosure, and its design is well within the ordinary skill of artisans.

Another way of viewing the invention is as an improved optical engine for use in a polychromatic projector having a white light source and an image processor. The engine preferably includes a generally concentric pair of generally square optical elements including an interior element, indicated in FIG. 1 generally at 38, having plural dichroic mirrors 12, 22, 28, 34 for selectively transmitting/reflecting light incident thereon and further having an exterior element, indicated in FIG. 1 generally at 40, having plural turning mirrors 14, 16, 24, 32 for reflecting light incident thereon and plural light valves 18, 26, 30, the dichroic mirrors splitting white light entering engine 10 in an entry region thereof, indicated in FIGS. 1 and 2 generally at 42, into at least three primary color light beams modulated by said light valves responsive to such an image processor and the turning mirrors combining such light beams into a modulated polychromatic light beam and directing such polychromatic light beam to an exit region of the engine, indicated in FIGS. 1 and 2 generally at 44, for projection thereof.

Another way of describing the invented improvement in connection with cubic optical engine 10 is to view the improvement as characterized by a single dichroic mirror 22 including opposing substantially parallel planar surfaces 22a, 22b, wherein the mirror is positioned and oriented within optical engine 10 selectively and simultaneously to split an unmodulated first light beam B incident upon one of said opposing surfaces 22b and simultaneously to combine the unmodulated first split light beam B with a modulated second light beam R incident upon the other of said opposing surfaces 22a, whereby the light beam emergent from the one surface contains both unmodulated and modulated color beam components.

Those of skill will appreciate that the improvement preferably involves more than one such dichroic mirror, as it may be seen from FIGS. 1 and 2 that in accordance with the preferred embodiment of the invention there are two such dichroic mirrors 22, 28, each of them being so-characterized. In fact, dichroic mirror 22 splits the green and blue beams GB while simultaneously combining the blue beam B so split from the green beam G and combining the split blue beam B with the modulated red beam R (a beam of light containing an unmodulated blue light component and a modulated red light component), and dichroic mirror 28 splits the red and blue beams RB while simultaneously combining the red beam R so split from the blue beam B with the modulated green beam G.

Accordingly, while a preferred embodiment of the invention has been described herein, and preferred methods associated therewith, it is appreciated that modifications are possible that are within the scope of the invention.

It is claimed and desired to secure by letters patent:

1. In an optical engine for splitting a first light beam into at least a second and a third light beam, for modulating the second and third light beams and for recombining the modulated light beams to produce an output light beam, the improvement comprising:

a single dichroic mirror including opposing substantially parallel planar surfaces, wherein said mirror is positioned and oriented within the optical engine selectively and simultaneously to split an unmodulated first light beam incident upon one of said opposing surfaces and to combine the unmodulated split light beam with a modulated second light beam incident upon the other of said opposing surfaces, thereby to produce a light beam emerging from said one of said opposing surfaces containing both unmodulated and modulated light beam components.

2. An improved optical engine for use in a polychromatic projector having a white light source and an image processor, the engine comprising:

a generally concentric pair of generally square optical element groups including an interior element group having plural dichroic mirrors for selectively transmitting and reflecting light incident thereon and an exterior element group having plural turning mirrors for reflecting light incident thereon and plural light valves, the dichroic elements splitting white light entering said engine in an entry region thereof into at least three primary color light beams modulated by said light valves responsive to such an image processor and combining such light beams into a modulated polychromatic light beam and directing such polychromatic light beam to an exit region of said engine for projection thereof.

3. The engine of claim 2 which further comprises tricolor beam astigmatism correction structure in the path of the polychromatic light beam directed to said exit region of said engine.

4. The engine of claim 3 which further comprises white light beam astigmatism correction structure in the path of the white light entering said engine.

5. The engine of claim 2, wherein said plural light valves are of the transmissive type.

6. In an optical engine for splitting a first light beam into at least a second and third light beam, for modulating the second and third light beams and for recombining the modulated light beams to produce an output light beam, a structure comprising:

a dichroic mirror including opposing substantially parallel planar surfaces, wherein said mirror is positioned and oriented within the optical engine selectively to transmit the second beam incident upon one of said opposing surfaces and to reflect the third beam incident upon the other of said opposing surfaces the second and third beams being of different colors, the second beam not being incident upon the other of the opposing surfaces.

7. In an optical engine for splitting a first light beam into at least a second and a third light beam, for modulating the second and third light beams and for recombining the modulated light beams to produce an output light beam, the improvement comprising:

a single dichroic mirror including opposing substantially parallel planar surfaces, wherein said mirror is positioned and oriented within the optical engine selectively and simultaneously to split a first light beam incident upon one of said opposing surfaces and to combine the split light beam with a modulated second light beam incident upon the other of said opposing surfaces.

8. An improved optical engine for use in a polychromatic projector, said engine comprising:

a pair of optically spaced dichroic mirrors including
an optical upstream mirror,
and a optical downstream mirror,
said mirrors being organized in the engine in a fashion with both functioning for both splitting and combining of light beams and components thereof in the engine, wherein the optical downstream mirror combines a beam split from the optical upstream mirror.

9. The optical engine of claim 8, wherein combining which is performed by said downstream mirror includes a beam component with respect to which combining has been performed by said upstream mirror.

10. The optical engine of claims 8 or 9, wherein, with respect to combining which is performed by said downstream mirror, such combining includes a beam component which was split by said upstream mirror.

11. The optical engine of claim 8, wherein said upstream and downstream dichroic mirrors are disposed in planes that lie at an angle relative to one another.

12. The optical engine of claim 11, wherein the planes of said mirrors are each normal to a third plane.

13. An improved optical engine for use in a polychromatic projector, said engine comprising:

a pair of optically spaced dichroic mirrors including
an optical upstream mirror,
and a optical downstream mirror.
said mirrors being organized in the engine in a fashion with both functioning for both splitting and combining of light beams and components thereof in the engine, wherein said upstream and downstream mirrors lie in planes which are orthogonal relative to one another.

14. An optical device for splitting a light beam into a plurality of light beams of different colors, modulating the plurality of light beams to form a plurality of modulated light beams, and combining the plurality of modulated light beams to produce a modulated output light beam, the device comprising:

a single dichroic mirror including opposing substantially parallel planar surfaces, wherein said mirror is positioned and oriented within the optical device selectively and simultaneously to split an unmodulated first light beam incident upon one of said opposing surfaces and to combine the unmodulated split light beam with a modulated second light beam incident upon the other of said opposing surfaces, thereby to produce a light beam emerging from said one of said opposing surfaces containing both unmodulated and modulated beam components.

15. An optical device for splitting a light beam into a plurality of light beams of different colors, modulating the plurality of light beams and recombining the modulated light beams to produce a modulated output light beam, the device comprising:

a single dichroic mirror including opposing substantially parallel planar surfaces, wherein said mirror is positioned and oriented within the optical device selectively and simultaneously to split a first light beam incident upon one of said opposing surfaces and to combine the split light beam with a modulated second light beam incident upon another of said opposing surfaces.

16. An optical engine comprising:

a dichroic structure arranged in an approximately rectangular configuration; and a turning mirror structure arranged in an approximately rectangular configuration, said dichroic structure and said turning mirror structure being concentric.

17. The optical engine of claim 16 wherein a light beam entering the optical engine is split into a plurality of component beams, each of said plurality of component beams traversing a same number of dichroic elements and turning elements within the optical engine.

* * * * *